US011429220B2

(12) United States Patent
Park

(10) Patent No.: US 11,429,220 B2
(45) Date of Patent: Aug. 30, 2022

(54) MODE CONTROLLER FOR VEHICLE, METHOD THEREFOR, AND VEHICLE SYSTEM

(71) Applicants: Hyundai Motor Company, Seoul (KR); Kia Motors Corporation, Seoul (KR)

(72) Inventor: Se Hoon Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/680,796

(22) Filed: Nov. 12, 2019

(65) Prior Publication Data
US 2020/0310585 A1    Oct. 1, 2020

(30) Foreign Application Priority Data
Mar. 25, 2019    (KR) .................. 10-2019-0033761

(51) Int. Cl.
*G06F 3/041* (2006.01)
*G06F 3/0488* (2022.01)
(52) U.S. Cl.
CPC .......... *G06F 3/0416* (2013.01); *G06F 3/0488* (2013.01); *G06F 2200/1636* (2013.01)

(58) Field of Classification Search
None
See application file for complete search history.

(56) References Cited

U.S. PATENT DOCUMENTS

| | | | | |
|---|---|---|---|---|
| 2006/0238517 | A1* | 10/2006 | King | G06F 3/044 |
| | | | | 345/173 |
| 2013/0103712 | A1* | 4/2013 | Li | G06F 16/9032 |
| | | | | 707/769 |
| 2018/0232195 | A1* | 8/2018 | Jaegal | G06F 3/14 |
| 2018/0314420 | A1* | 11/2018 | Bouaziz | G06F 3/04886 |
| 2019/0011041 | A1* | 1/2019 | Kirilenko | G06F 3/04883 |

* cited by examiner

*Primary Examiner* — Ifedayo B Iluyomade
(74) *Attorney, Agent, or Firm* — Fox Rothschild LLP

(57) ABSTRACT

A mode controller for a vehicle, a method therefor, and a vehicle system are provided. The mode controller includes a screen configuration device that configures a touch input screen on a touch screen and a controller that detects a pattern of a touch input which is input through the touch input screen. A determination device compares the detected pattern of the touch input with a plurality of patterns which are previously defined for each mode to determine whether there is a pattern identical to the pattern of the touch input. A mode execution device executes a function of a mode defined in response to the pattern identical to the pattern of the touch input.

12 Claims, 15 Drawing Sheets

| MODE | INPUT | |
|---|---|---|
| P-RANGE | P | ～911 |
| R-RANGE | R | ～912 |
| N-RANGE | N | ～913 |
| D-RANGE | D | ～914 |
| ECO MODE | ↵ | ～915 |
| SPORT MODE | ↳ | ～916 |

FIG.9

MODE CONTROLLER FOR VEHICLE, METHOD THEREFOR, AND VEHICLE SYSTEM

CROSS-REFERENCE TO RELATED APPLICATION

This application is claims the benefit of priority to Korean Patent Application No. 10-2019-0033761, filed on Mar. 25, 2019, the entire contents of which are incorporated herein by reference.

TECHNICAL FIELD

The present disclosure relates to a mode controller for a vehicle, a method therefor, and a vehicle system.

BACKGROUND

A dashboard, a center fascia, a steering wheel, or the like include hardkey buttons within a vehicle to allow a user to control convenience functions such as air conditioning, a drive mode, and a heating seat. Recently, there has been a growing trend towards integrating convenience functions controlled by hardkeys into a softkey or a touch screen.

However, when control buttons are integrated into the touch screen or the softkey, since it is difficult to recognize a button by a sense of touch to block the view of a driver while driving, a safety problem may occur. Furthermore, as a setting option of the touch screen is multi-stepped, because of the complexity of selecting a mode, it takes a long time to learn each function and it may be difficult to control an option while driving.

SUMMARY

The present disclosure provides a mode controller for a vehicle that increases the convenience of a driver without damaging driving safety by rapidly performing conversion into various modes by simplified manipulation of a screen on the touch screen while driving, a method therefor, and a vehicle system.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a mode controller for a vehicle may include: a screen configuration device that provides a touch input screen on a touch screen, a controller configured to detect a pattern of a touch input which is input through the touch input screen, a determination device configured to compare the recognized pattern of the touch input with a plurality of patterns which are previously defined for each mode to determine whether there is a pattern identical to the pattern of the touch input, and a mode execution device configured to execute a function of a mode defined in response to the pattern identical to the pattern of the touch input.

The controller may be configured to execute a mode selection function, when a first touch input of a predetermined pattern is input through a first region of the touch screen. The screen configuration device may provide the touch input screen on the touch screen, when the mode selection function is executed. In particular, the screen configuration device may enable one region of a main screen of the touch screen as the touch input screen, when the mode selection function is executed. Additionally, the screen configuration device may enable one region of a background screen of the touch screen as the touch input screen, when the mode selection function is executed.

The mode configuration device may be configured to generate a pop-up window as the touch input screen, when the mode selection function is executed. The first region of the touch screen may be a bezel region. The controller may be configured to crop a screen including the pattern of the touch input based on a start point and an end point of the touch input and an end of the pattern of the touch input and may be configured to detect the pattern of the touch input based on the cropped screen. The plurality of patterns may be defined as different characters, sign shapes, or drag directions for each mode.

According to another aspect of the present disclosure, a mode control method for a vehicle may include: configuring a touch input screen on a touch screen, detecting a pattern of a touch input which is input through the touch input screen, comparing the detected pattern of the touch input with a plurality of patterns which are previously defined for each mode to determine whether there is a pattern identical to the pattern of the touch input, and executing a function of a mode defined in response to the pattern identical to the pattern of the touch input.

The method may further include executing a mode selection function, when a first touch input of a predetermined pattern is input through a first region of the touch screen. The configuring of the touch input screen may include configuring the touch input screen on the touch screen, when the mode selection function is executed. The configuring of the touch input screen may further include enabling one region of a main screen of the touch screen as the touch input screen, when the mode selection function is executed.

Further, the configuring of the touch input screen may include enabling one region of a background screen of the touch screen as the touch input screen, when the mode selection function is executed. The configuring of the touch input screen may include executing a pop-up window as the touch input screen, when the mode selection function is executed. The first region of the touch screen may be a bezel region.

The detection of the pattern of the touch input may include cropping a screen including the pattern of the touch input based on a start point and an end point of the touch input and an end of the pattern of the touch input and detecting the pattern of the touch input based on the cropped screen. The plurality of patterns may be defined as different characters, sign shapes, or drag directions for each mode.

According to another aspect of the present disclosure, a vehicle system may include: a touch screen and a mode controller configured to detect a pattern of a touch input which is input through a touch input screen configured on the touch screen, compare the detected pattern of the touch input with a plurality of patterns which are previously defined for each mode to determine whether there is a pattern identical to the pattern of the touch input, and execute a function of a mode defined in response to the pattern identical to the pattern of the touch input.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
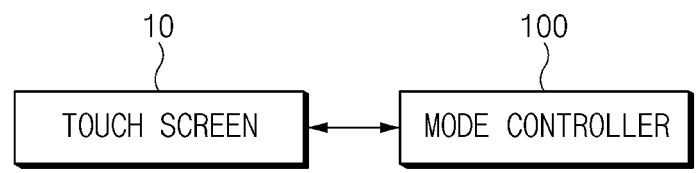
FIG. 1 is a block diagram illustrating a configuration of a vehicle system to which a mode controller for a vehicle is applied, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a vehicle system to which a mode controller for a vehicle is applied, according to an exemplary embodiment of the present disclosure. Referring to FIG. 1, the vehicle system according to an exemplary embodiment of the present disclosure may include a touch screen 10 and a mode controller 100. The touch screen 10 may be implemented in the form of integrating an input device for receiving a control command from a user with an output device for outputting a vehicle operation, an operation state and result of the mode controller 100, and/or the like.

The touch screen 10 may be a display including a touch sensor such as a touch film, a touch sheet, or a touch pad. In particular, the display may include at least one of a liquid crystal display (LCD), a thin film transistor-LCD (TFT-LCD), an organic light-emitting diode (OLED) display, a flexible display, a field emission display (FED), and/or a three-dimensional (3D) display. Herein, the touch screen 10 may be disposed on a location capable of being manipulated from the driver's seat of the vehicle. As an example, the touch screen 10 may be a navigation screen of a center fascia installed within the vehicle.

When a touch input of a predetermined pattern is detected on the touch screen 10, the mode controller 100 may be configured to execute a mode selection function. In particular, the mode controller 100 may enable one region for inputting a mode selection signal on the touch screen 10. Meanwhile, the mode controller 100 may be configured to generate a pop-up window for receiving an input of a mode selection signal and may be configured to output the pop-up window on the touch screen 10. Thus, the mode controller 100 may be configured to determine a mode to be converted, based on a touch input signal input which is input through the enabled one region or the pop-up window and may be configured to perform mode conversion.

The mode controller 100 according to an exemplary embodiment of the present disclosure may be implemented in the vehicle. In particular, the mode controller 100 may be integrated with controllers mounted within the vehicle or may be implemented as a device independent of the controllers within the vehicle to be connected with the controllers of the vehicle by a separate connection.

Figure 2:
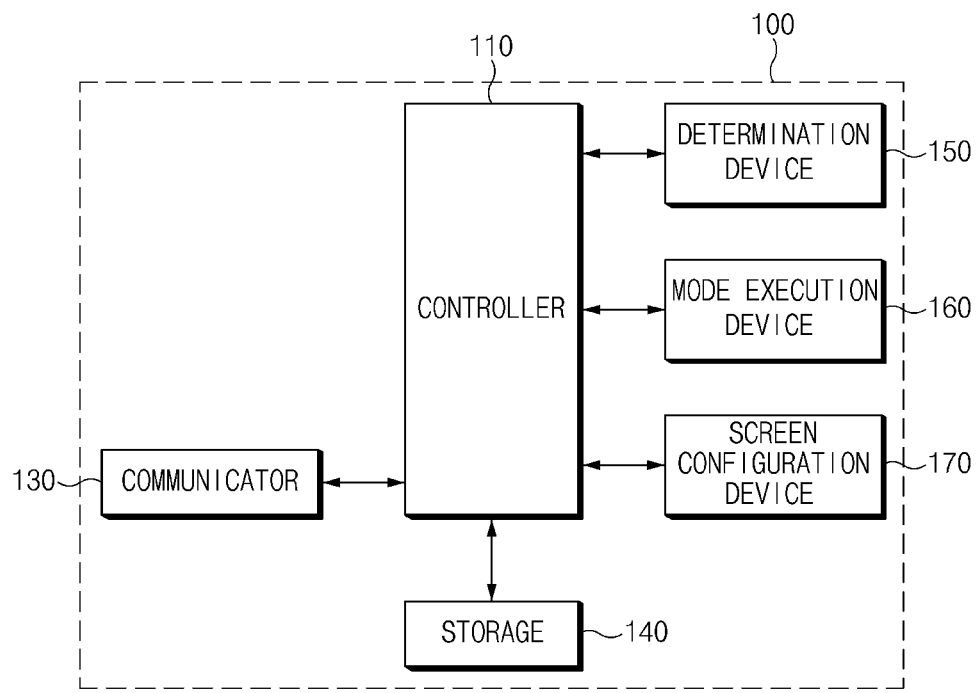
FIG. 2 is a block diagram illustrating a configuration of a mode controller for a vehicle according to an exemplary embodiment of the present disclosure.

Furthermore, the mode controller 100 may be configured to transmit and receive a signal with the touch screen 10 via vehicle network communication. Thus, a detailed description of a configuration and operation of the mode controller 100 will be given with reference to an exemplary embodiment of FIG. 2. FIG. 2 is a block diagram illustrating a configuration of a mode controller for a vehicle according to an exemplary embodiment of the present disclosure. Referring to FIG. 2, the mode controller 100 may include a controller 110, a communicator 130, a storage 140, a determination device 150, a mode execution device 160, and a screen configuration device 170. Herein, the controller 110, the determination device 150, the mode execution device 160, and the screen configuration device 170 of the mode controller 100 according to an exemplary embodiment of the present disclosure may be implemented as at least one or more processors.

The controller 110 may be configured to process a signal transmitted between the respective components of the mode controller 100. The communicator 130 may include a communication module for vehicle network communication with electronics and/or controllers mounted within the vehicle. As an example, the communication module may be communicatively connected with a touch screen 10 of FIG. 1 to receive a touch input signal input through the touch screen 10. Furthermore, the communication module may be configured to transmit the result of processing an operation based on a touch input received from the touch screen 10 to the touch screen 10.

Herein, vehicle network communication technologies may include vehicle network communication or the like such as controller area network (CAN) communication, local interconnect network (LIN) communication, or flex-ray communication. Furthermore, the communicator 130 may include a module for wireless Internet access or a communication module for short range communication.

Herein, wireless Internet technologies may include a wireless local area network (WLAN), wireless broadband (Wibro), wireless-fidelity (Wi-Fi), world interoperability for microwave access (WiMAX), or the like. Furthermore, short range communication technologies may include Bluetooth, ZigBee, ultra wideband (UWB), radio frequency identification (RFID), infrared data association (IrDA), or the like.

The storage 140 or memory may be configured to store data, an algorithm, and/or the like necessary to operate the mode controller 100. As an example, the storage 140 may be configured to store pattern information of a touch input for enabling a mode selection function. Furthermore, the storage 140 may be configured to store pattern information (in a database) for detecting a command to be converted into each mode. Moreover, the storage 140 may be configured to store a command, an algorithm, and/or the like for enabling the mode selection function based on a touch input, enabling one region of a screen on the touch screen 10 or generating a pop-up window, detecting a pattern of the touch input, and converting a mode. Herein, the storage 140 may include storage media such as a random access memory (RAM), a static RAM (SRAM), a read-only memory (ROM), a programmable ROM (PROM), and an electrically erasable PROM (EEPROM).

Figure 3:
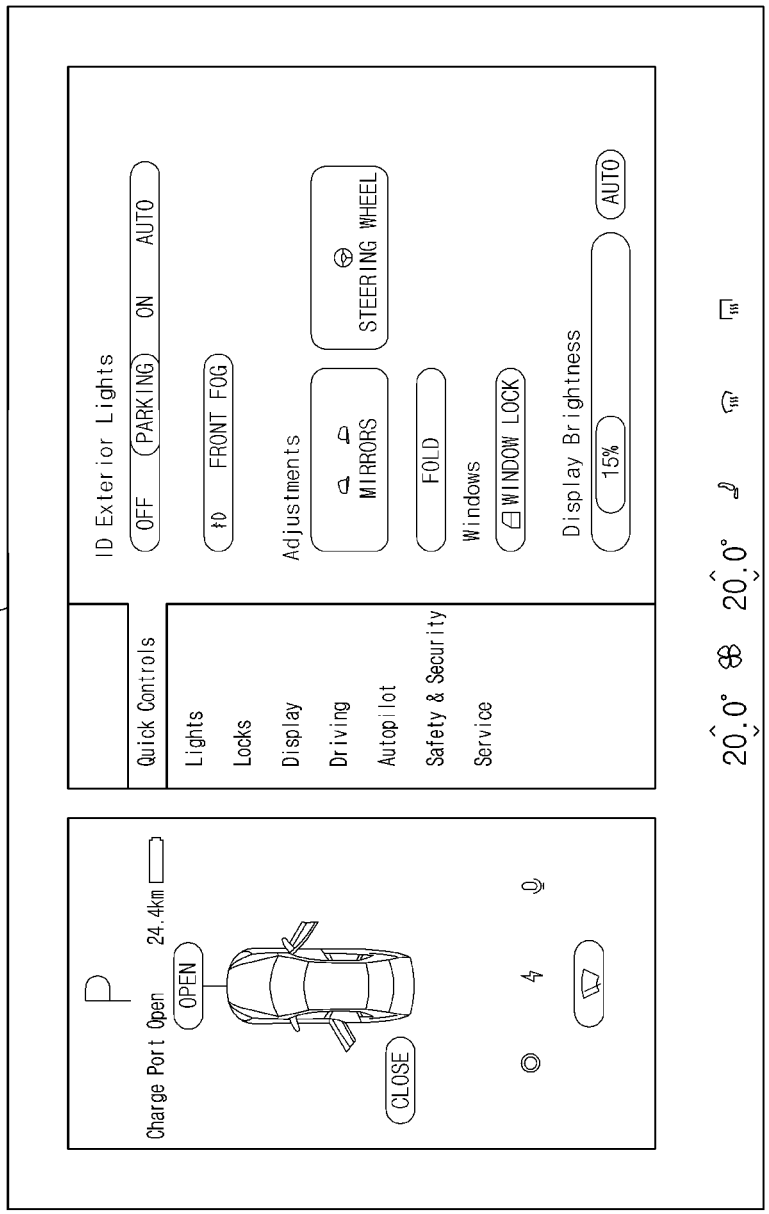
FIGS. 3, 4A, 4B, 5A, 5B, 6, 7A, 7B, 8A, 8B, an 9 are drawings illustrating embodiments referenced to describe an operation of a mode controller for a vehicle according to an exemplary embodiment of the present disclosure.

The screen configuration device 170 may configure or provide a touch input screen on the touch screen 10 to enable the mode selection function and/or a mode conversion function. FIG. 3 illustrates a default screen 311 of a touch screen. When one region (e.g., a bezel region) of the touch screen 10 is touched in a state where the mode selection function is disabled, the screen configuration device 170 may be configured to enable a screen region for receiving a first touch input signal. Herein, the screen region for receiving the first touch input signal may be a bezel region.

Particularly, the screen configuration device 170 may be configured to enable a portion of a bezel region in an upward, downward, left, or right direction. Meanwhile, the screen configuration device 170 may be configured to enable all of the bezel regions in the upward, downward, left, and right directions. An exemplary embodiment thereof will be given with reference to FIGS. 4A and 4B.

Figure 4A:
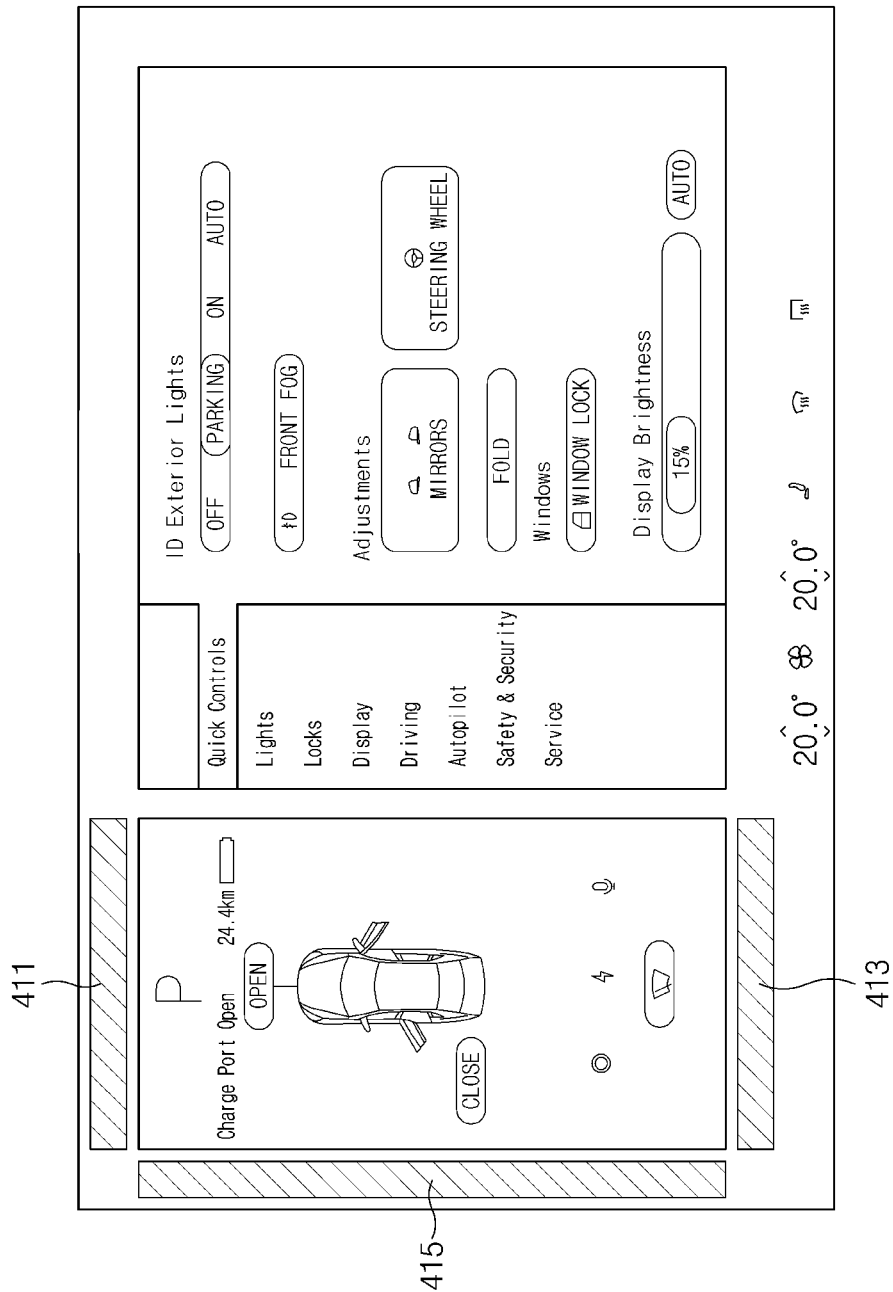

FIG. 4A illustrate an exemplary embodiment of enabling a portion of a bezel region. When one region (e.g., a bezel region) of a touch screen 10 of FIG. 1 is touched or manipulated in a state where a mode selection function is disabled, as shown in FIG. 4A, a screen configuration device 170 of FIG. 2 may be configured to enable a portion 411 of an upper bezel region, a portion 413 of a lower bezel region, and a left bezel region 415. In particular, when a first touch input from a driver is input through at least any one of the enabled bezel regions 411, 413, and 415, a communicator 130 of FIG. 2 may be configured to receive a first touch input signal and deliver the received first touch input signal to a controller 110 or the like of FIG. 2.

Figure 4B:
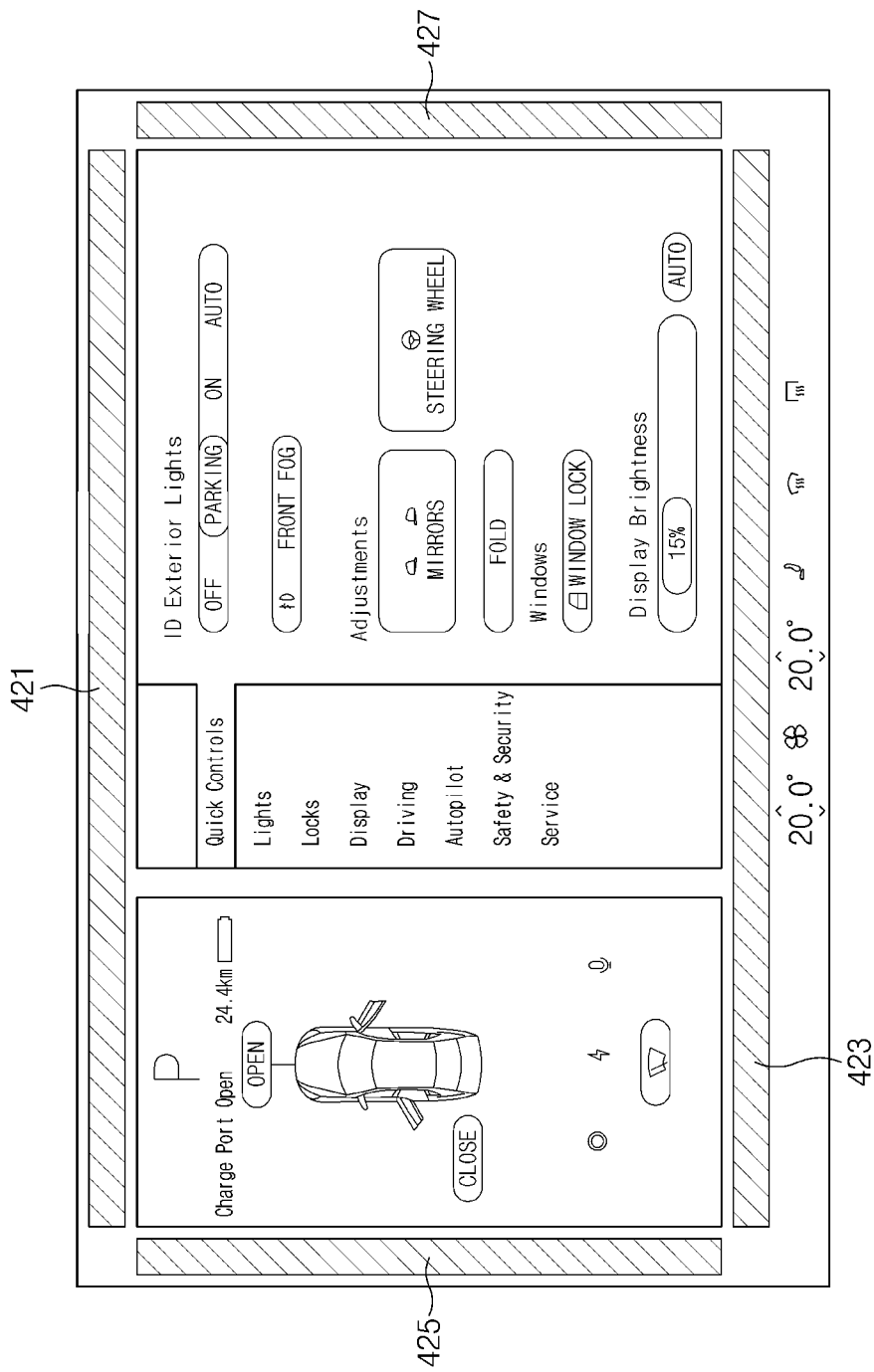

FIG. 4B illustrates an exemplary embodiment of enabling the entire bezel region. When one region (e.g., a bezel region) of a touch screen 10 of FIG. 1 is touched or manipulated in a state where a mode selection function is disabled, as shown in FIG. 4B, a screen configuration device 170 of FIG. 2 may be configured to enable an upper bezel region 421, a lower bezel region 423, a left bezel region 425, and a right bezel region 427.

In particular, when a first touch input from a driver is input through at least any one of the enabled bezel regions 421, 423, 425, and 427, a communicator 130 of FIG. 2 may be configured to receive a first touch input signal and deliver the received first touch input signal to a controller 110 or the like of FIG. 2. When the first touch input signal is received from the enabled bezel region of the touch screen 10, the controller 110 may be configured to detect an input pattern of the first touch input signal and may deliver information regarding the recognized input pattern of the first touch input signal to a determination device 150 of FIG. 2.

The determination device 150 may be configured to compare the input pattern of the first touch input signal with patterns previously stored in a storage 140 of FIG. 2 or within a database of the storage 140. The determination device 150 may be configured to determine whether the input pattern of the first touch input signal is identical to any one of the previously stored patterns and may be configured to deliver the result to the controller 110.

Particularly, the determination device 150 may be configured to compare the input pattern of the first touch input signal received in a state where the mode selection function is disabled with a previously stored first pattern to determine whether the input pattern of the first touch input signal is identical to the previously stored first pattern. When the input pattern of the first touch input signal is identical to the previously stored first pattern, the determination device 150 may be configured to deliver or transmit the determined result to the controller 110.

Herein, the first pattern may be a pattern defined in response to a command to enable the mode selection function. As an example, the first pattern may be a drag pattern in a particular direction. Meanwhile, when there is no pattern identical to the input pattern of the first touch input signal, the determination device 150 may be configured to deliver or transmit the result where the input pattern of the first touch input signal differs from the previously stored first pattern to the controller 110.

In response to determining that the input pattern of the first touch input signal is identical to the first pattern corresponding to the mode selection function based on the determined result of the determination device 150, the controller 110 may be configured to enable the mode selection function based on the first touch input signal. In particular, when the mode selection function is enabled, a screen configuration device 170 of FIG. 2 may be configured to enable one region of a screen on the touch screen 10 as a screen for inputting a selection mode.

Herein, the screen configuration device 170 may be configured to enable one region of a main screen of the touch screen 10. The screen configuration device 170 may be configured to enable one region of a background screen of the touch screen 10. Meanwhile, the screen configuration device 170 may be configured to generate a separate pop-up window for inputting a selection mode and may be configured to display the pop-up window on a screen of the touch screen 10. An exemplary embodiment thereof will be given with reference to FIGS. 5A and 5B.

Figure 5A:
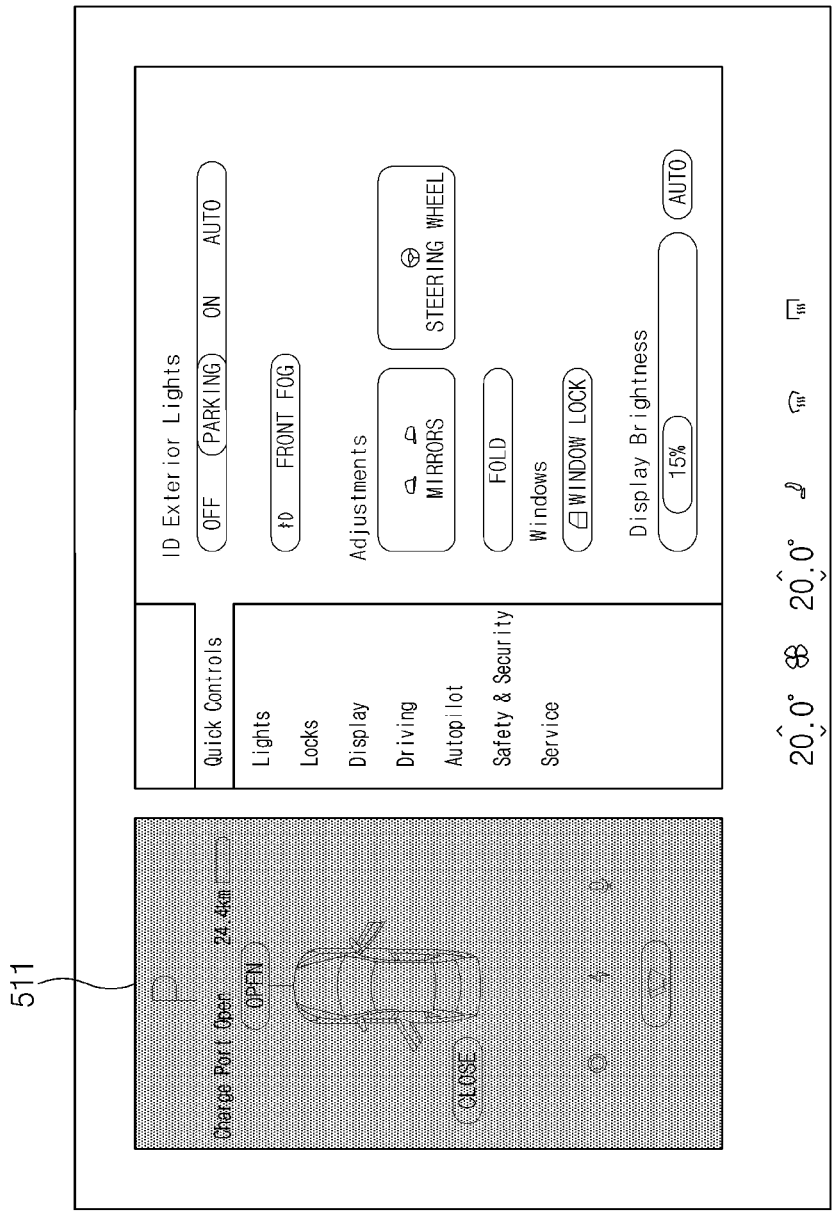
Figure 6:
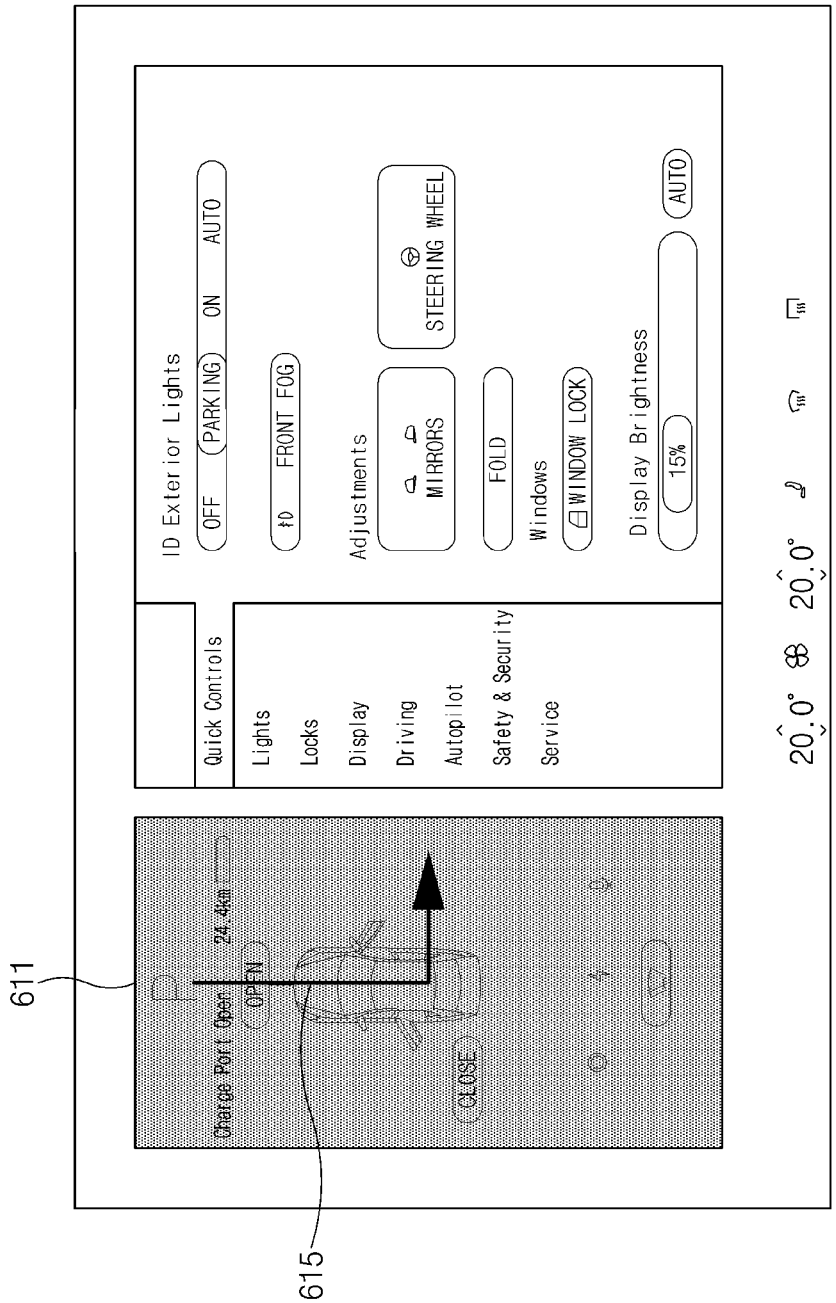

FIG. 5A illustrates an exemplary embodiment of enabling one region of a background screen of a touch screen. FIG. 6 illustrates an exemplary embodiment referenced to describe an operation of a mode controller for a vehicle. Referring to FIG. 5A, when a mode selection function is enabled, a screen configuration device 170 of FIG. 2 may be configured to enable one region 511 of a background screen for a second touch input. In particular, a driver may input a second touch input through the enabled one region 511 of the background screen. An exemplary embodiment for inputting the second touch input through the enabled one region 511 of the background screen will be given with reference to FIG. 6.

As shown in FIG. 6, when one region 611 of a background screen of a touch screen 10 of FIG. 1 is enabled, the driver may input a second touch input 615 of a certain pattern for enabling a specific mode function among a plurality of modes implemented in a vehicle through the enabled region 611. Thus, when the second touch input 615 is input from the driver through the one region 611 of the background screen, a communicator 130 of FIG. 2 may be configured to receive the second touch input signal 615 and deliver or transmit the received second touch input signal 615 to a controller 110 or the like of FIG. 2.

Figure 5B:
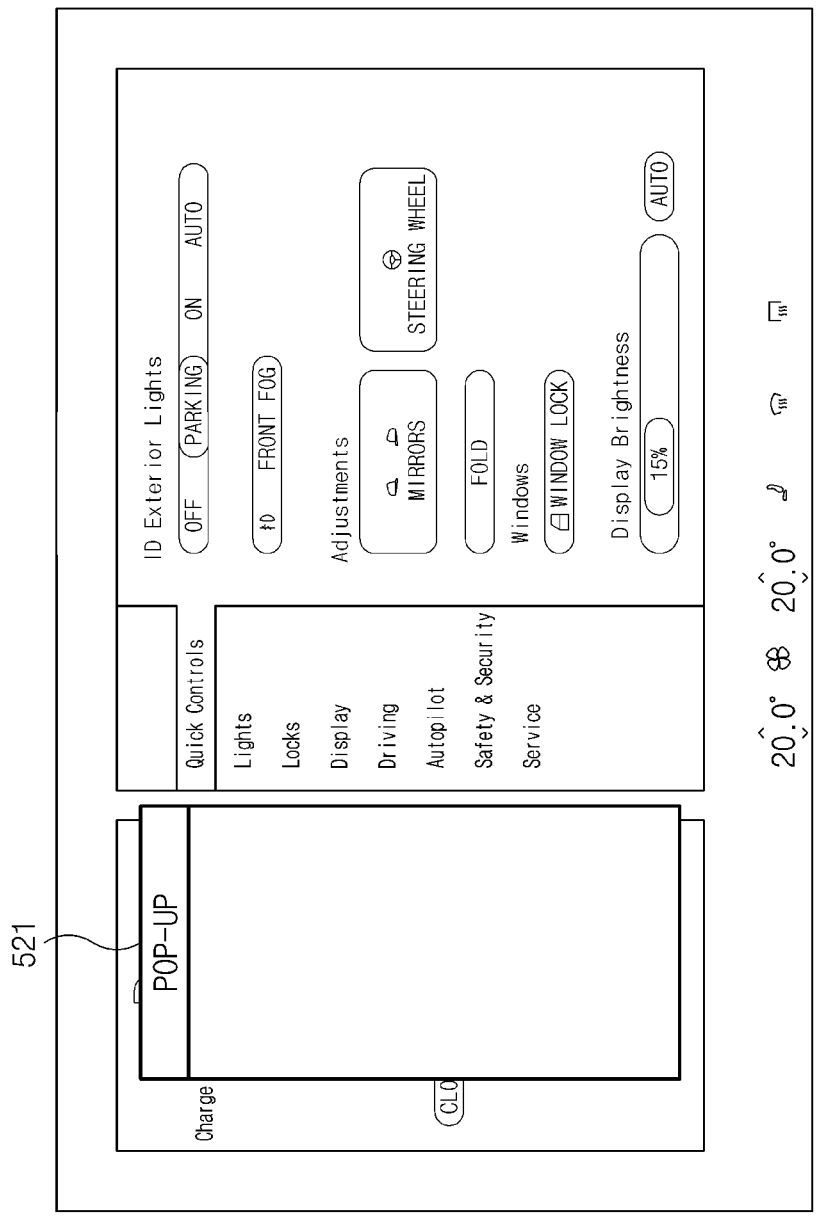

FIG. 5B illustrates an exemplary embodiment for running a separate pop-up window. FIGS. 7A to 8B illustrate exemplary embodiments referenced to describe an operation of a mode controller for a vehicle. Referring to FIG. 5B, when a mode selection function is enabled, a screen configuration device 170 of FIG. 2 may be configured to generate a pop-up window 521 for a second touch input. In particular, the screen configuration device 170 may be configured to display the generated pop-up window 521 on a screen of a touch screen 10 of FIG. 1.

The driver may input a second touch input through the pop-up window 521 displayed on the screen of the touch screen 10. Thus, when the second touch input is input from the driver through the pop-up window 521 displayed on the screen of the touch screen 10, a communicator 130 of FIG. 2 may be configured to receive the second touch input signal and deliver or transmit the received second touch input signal to a controller 110 or the like of FIG. 2.

When the second touch input signal input through the enabled one region or the pop-up window on the touch screen 10 in the state where the mode selection function is enabled is received, the controller 110 may be configured to detect an input pattern of the second touch input signal. A detailed description of the operation of detecting the input pattern of the touch input signal will be given with reference to FIGS. 7A to 8B.

When the second touch input signal input through the enabled screen region or the pop-up window in the state where the mode selection function is enabled is received, the controller 110 may be configured to analyze and detect a pattern of the received second touch input signal. The controller 110 may be configured to detect a start point and an end point of the pattern in which the second touch input signal is input on the touch screen 10 and an end of the entire input pattern, may be configured to crop a screen including the input pattern, and detect the input pattern in the cropped screen.

Figure 7A:
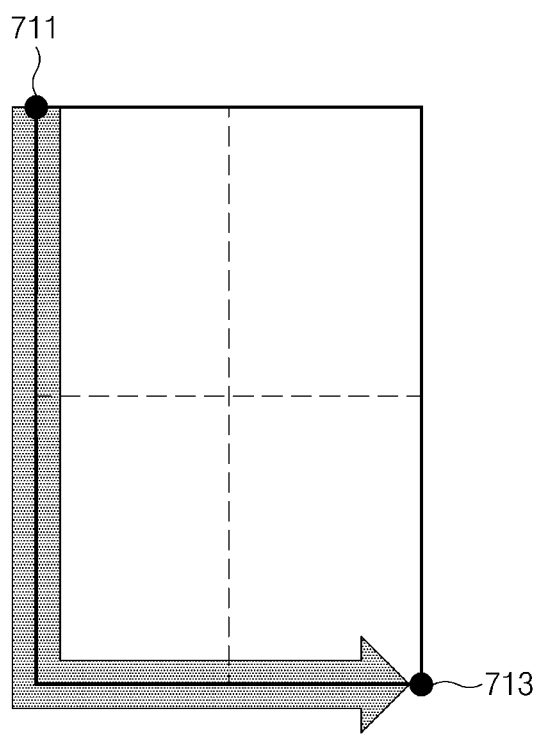

In particular, the controller 110 may be configured to detect a drag direction from the start point and the end point of the input pattern. Furthermore, the controller 110 may be configured to split the entire pattern included in the cropped screen into screens and detect the screens to detect a character. Additionally, the controller 110 may be configured to detect a left end and lower end based on a start point 711 and an end point 713 of an input pattern and may be configured to crop a screen including the input pattern as shown in FIG. 7A. In particular, the controller 110 may be configured to detect an L-shaped pattern from a pattern included in the cropped screen of FIG. 7A.

Figure 7B:
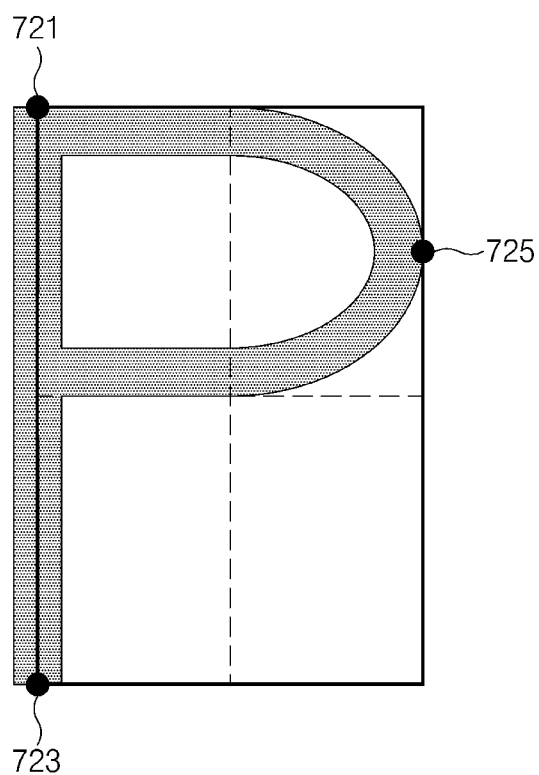

The controller 110 may further be configured to detect a left end and a right end 725 based on a start point 721 and an end point 723 of an input pattern and may be configured to crop a screen including the input pattern as shown in FIG. 7B. In particular, the controller 110 may be configured to detect a P-shaped pattern from a pattern included in the cropped screen of FIG. 7B. By detecting a pattern from the screen cropped based on the start point and the end point of the input pattern and the end of the input pattern, the controller 110 may be configured to detect the input pattern irrespective of a location of the screen where the second touch input is input.

Figure 8A:
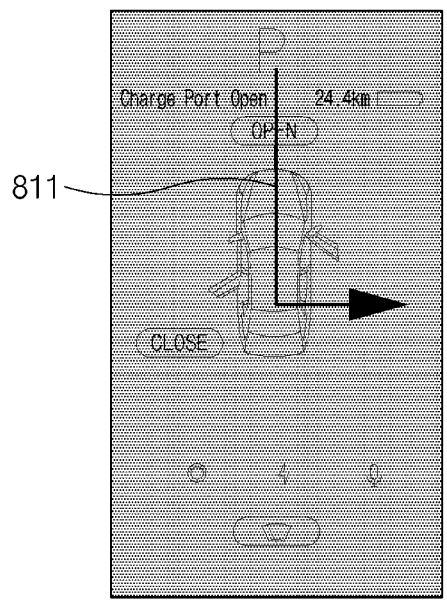
Figure 8B:
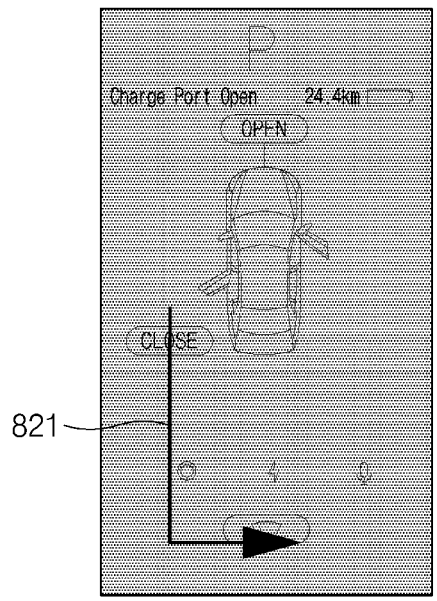

As an example, in exemplary embodiments of FIGS. 8A and 8B, only locations of second touch inputs 811 and 821 may differ from each other, and patterns thereof may be the same. The controller 110 may be configured to detect a first pattern from a cropped screen of the second touch input 811 which is input to a first region of an enabled screen as shown in FIG. 8A. Furthermore, the controller 110 may be configured to detect a second pattern from a cropped screen of the second touch input 821 which is input to a second region as shown in FIG. 8B. Particularly, although locations to which the second touch inputs 811 and 821 are input differ from each other, the controller 110 may be configured to detect the first pattern and the second pattern, recognized through the cropped screen, as the same pattern.

The description is given of the exemplary embodiment for detecting the input pattern of the second touch input signal, but an input pattern of a first touch input signal may also be detected in the same manner. The controller 110 may be configured to transmit or deliver information regarding the detected input pattern of the second touch input signal to a determination device 150 of FIG. 2. In response, the determination device 150 may be configured to compare the input pattern of the second touch input signal with a plurality of second patterns which are previously stored in a storage 140 of FIG. 2. The determination device 150 may be configured to determine whether the input pattern of the second touch input signal is identical to any one of the plurality of second patterns which are previously stored in the storage 140. When the input pattern of the second touch input signal is identical to any one second pattern, the determination device 150 may be configured to transmit the determined result to the controller 110.

Herein, the plurality of second patterns may be patterns defined in response to a command to enable each mode function implemented in the vehicle. For example, the plurality of second patterns may be defined in response to a command to enable each of driving modes such as a transmission mode of a park (P)-range, a reverse (R)-range, a neutral (N)-range, or a drive (D)-range, an eco-mode, a sport mode, and a snow chain mode. In particular, the plurality of second patterns may be defined as patterns of different characters and/or directions for each mode. An exemplary embodiment for the plurality of second patterns will be given with reference to FIG. 9.

FIG. 9 illustrates a second pattern defined for each mode. Referring to FIG. 9, a P-range transmission mode may be defined as a P-shaped pattern 911, an R-range transmission mode may be defined as an R-shaped pattern 912, an N-range transmission mode may be defined as an N-shaped pattern 913, and a D-range transmission mode may be defined as a D-shaped pattern 914.

Furthermore, an eco-mode among driving modes may be defined as a pattern 915 of an arrow shape which is bent to the left in a lower direction. A sport mode among the driving modes may be defined as a pattern 916 of an arrow shape which is bent to the right in the lower direction.

For example, when an input pattern of a second touch input signal is identical to a pattern defined in response to the P-range transmission mode among a plurality of second patterns, a determination device 150 of FIG. 2 may be configured to transmit the result to a controller 110 of FIG. 2. Additionally, when the input pattern of the second touch input signal is identical to a pattern defined in response a sport mode among the plurality of second patterns, the determination device 150 may be configured to transmit the result to the controller 110.

Meanwhile, when there is no pattern identical to the input pattern of the second touch input signal, the determination device 150 may be configured to transmit the result that the input pattern of the second touch input signal differs from the plurality of second patterns to the controller 110. In response to determining that the input pattern of the second touch input signal is identical to a pattern defined in response to a specific mode based on the determined result of the determination device 150, the controller 110 may be configured to determine a selection mode based on the second touch input signal. The controller 110 may be configured to transmit the determined selection mode information to the mode execution device 160.

Accordingly, the mode execution device 160 may be configured to convert a transmission mode, a driving mode, and/or the like of a vehicle based on the selection mode information transmitted from the controller 110. For example, when the mode selection information corresponds to the P-range transmission mode, the mode execution device 160 may be configured to switch the transmission mode of the vehicle to a P-range. Meanwhile, when the selection mode information corresponds to a sport mode, the mode execution device 160 may be configured to switch a driving mode of the vehicle to the sport mode.

As described above, the mode controller 100 according to an exemplary embodiment of the present disclosure may be configured to rapidly switch a convenience function, such as a transmission mode, a driving mode, or the like of the vehicle, by a manipulation of the touch screen 100. The mode controller 100 according to an exemplary embodiment of the present disclosure, which performs the above-mentioned operations, may be implemented in the form of an independent hardware device including a memory and a processor for processing each operation or may be driven in the form of being included in another hardware device such as a microprocessor or a universal computer system.

Figure 10:
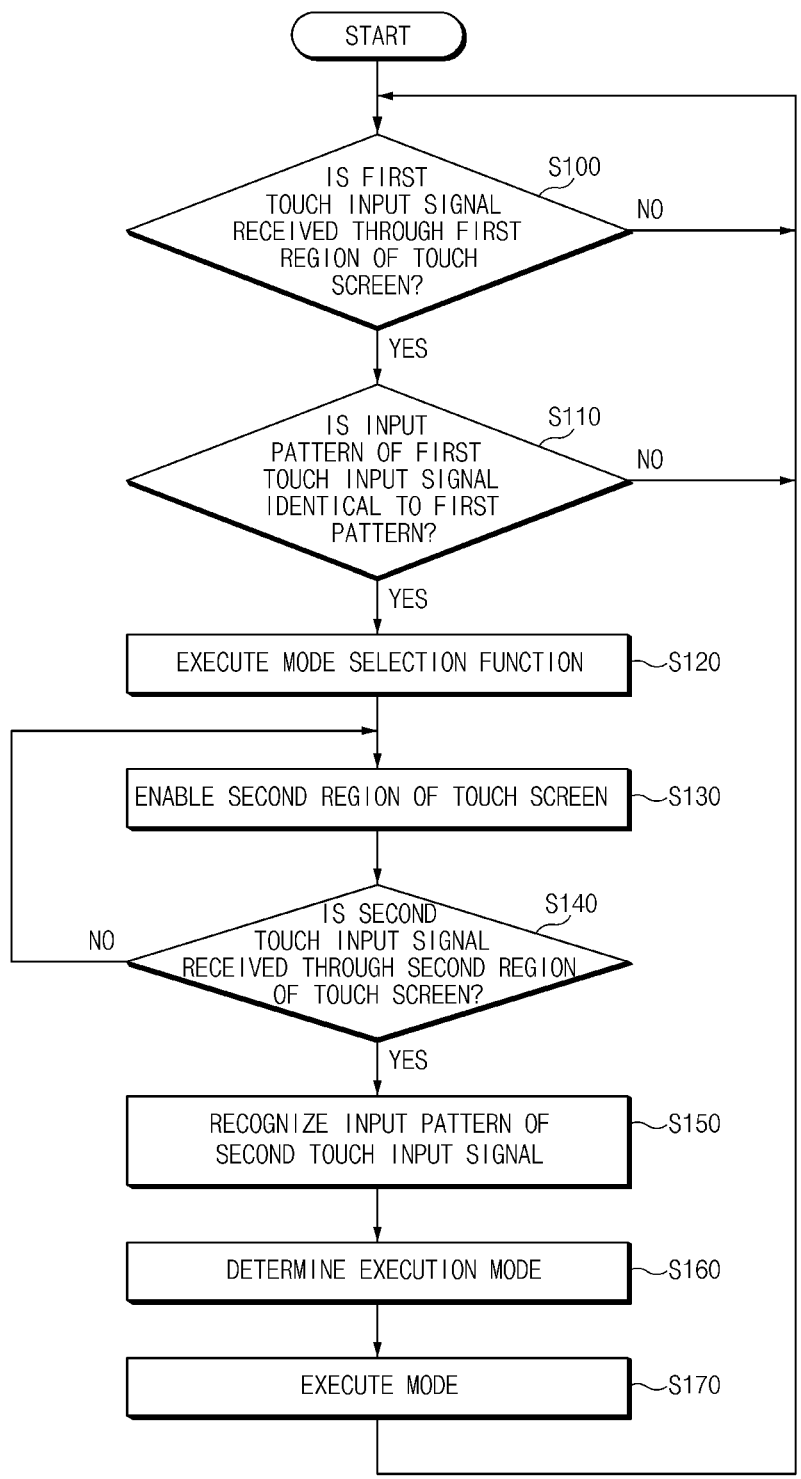
FIG. 10 is a flowchart illustrating an operation of a mode control method for a vehicle according to an exemplary embodiment of the present disclosure.

A description will be given in detail of an operation flow of the mode controller 100 according to an exemplary embodiment of the present disclosure, including the above-mentioned configuration. FIG. 10 is a flowchart illustrating an operation of a mode control method for a vehicle according to an exemplary embodiment of the present disclosure.

Referring to FIG. 10, when a first touch input signal is received through a first region of a touch screen 10 of FIG. 1 in a state where a mode selection function is disabled in S100, in S110, a mode controller 100 of FIG. 2 may be configured to determine whether an input pattern of the first touch input signal is identical to a first pattern. When the input pattern of the first touch input signal is identical to the first pattern in S110, in S120, the mode controller 100 may be configured to execute a mode selection function.

When the mode selection function is executed, in S130, the mode controller 100 may be configured to enable a second region of the touch screen 10. Thereafter, when a second touch input signal is received through the enabled one region in S140, in S150, the mode controller 100 may be configured to detect an input pattern of the second touch input signal. In S160, the mode controller 100 may be configured to detect a second pattern identical to the pattern detected in S150 among a plurality of second patterns defined for each mode and may be configured to determine an execution mode based on the detected second pattern. When the execution mode is determined in S160, in S170, the mode controller 100 may be configured to execute the mode.

Figure 11:
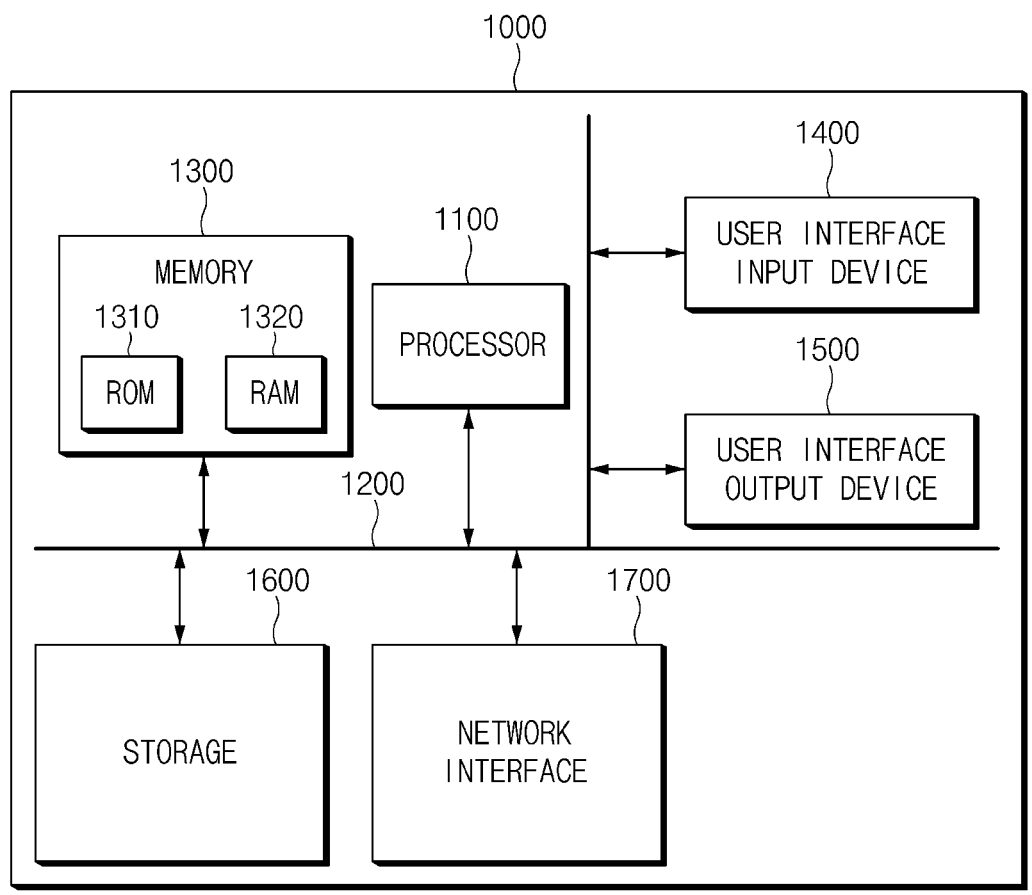
FIG. 11 is a block diagram illustrating a computing system which executes a method according to an exemplary embodiment of the present disclosure.

FIG. 11 is a block diagram illustrating a computing system which executes a method according to an exemplary embodiment of the present disclosure. Referring to FIG. 11, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (e.g., the memory 1300 and/or the storage 1600) such as a RAM memory, a flash memory, a ROM memory, an EPROM memory, an EEPROM memory, a register, a hard disk, a removable disk, and a CD-ROM. The exemplary storage medium may be coupled to the processor 1100, and the processor 1100 may read information out of the storage medium and may record information in the storage medium.

Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to exemplary embodiments of the present disclosure, the mode controller may be configured to increase the convenience of the driver without damaging driving safety by rapidly performing conversion into various modes by a manipulation of a screen on the touch screen while driving.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A mode controller for a vehicle, comprising:
    a controller configured to:
        execute a mode selection function when a first touch input of a predetermined pattern is input through a first region of a touch screen;
        generate a pop-up window as a touch input screen on the touch screen when the mode selection function is executed; and
        detect a pattern of a touch input which is input through the touch input screen;
    a determination device configured to compare the detected pattern of the touch input with a plurality of patterns which are previously defined for each mode to determine whether there is a pattern identical to the pattern of the touch input; and
    a mode execution device configured to execute a function of a mode defined in response to the pattern identical to the pattern of the touch input,
    wherein the mode includes at least one of a transmission mode and a driving mode,
    wherein the controller is configured to crop a screen including the pattern of the touch input based on a start point and an end point of the touch input and an end of the pattern of the touch input and detect the pattern of the touch input based on the cropped screen, and
    wherein the controller is configured to split the pattern of the touch input included in the cropped screen into screens and detect the screens to detect a character.

2. The mode controller of claim 1, wherein the controller is configured to enable one region of a main screen of the touch screen as the touch input screen, when the mode selection function is executed.

3. The mode controller of claim 1, wherein the controller is configured to enable one region of a background screen of the touch screen as the touch input screen, when the mode selection function is executed.

4. The mode controller of claim 1, wherein the first region of the touch screen includes a portion of a bezel region.

5. The mode controller of claim 1, wherein the first region of the touch screen includes an entire bezel region.

6. The mode controller of claim 1, wherein the plurality of patterns are defined as different characters, sign shapes, or drag directions for each mode.

7. A mode control method for a vehicle, comprising:
    executing, by a controller, a mode selection function when a first touch input of a predetermined pattern is input through a first region of a touch screen;
    generating, by the controller, a pop-up window as a touch input screen on the touch screen when the mode selection function is executed;
    detecting, by the controller, a pattern of a touch input which is input through the touch input screen;
    comparing, by the controller, the detected pattern of the touch input with a plurality of patterns which are previously defined for each mode to determine whether there is a pattern identical to the pattern of the touch input; and
    executing, by the controller, a function of a mode defined in response to the pattern identical to the pattern of the touch input,
    wherein the mode includes at least one of a transmission mode and a driving mode,
    wherein the detecting of the pattern of the touch input includes:
        cropping, by the controller, a screen including the pattern of the touch input based on a start point and an end point of the touch input and an end of the pattern of the touch input; and
        detecting, by the controller, the pattern of the touch input based on the cropped screen, and
    wherein the detecting of the pattern of the touch input based on the cropped screen includes:
        splitting, by the controller, the pattern of the touch input included in the cropped screen into screens; and
        detecting, by the controller, the screens to detect a character.

8. The method of claim 7, wherein the configuring of the touch input screen includes:
    enabling, by the controller, one region of a main screen of the touch screen as the touch input screen, when the mode selection function is executed.

9. The method of claim 7, wherein the configuring of the touch input screen includes:
    enabling, by the controller, one region of a background screen of the touch screen as the touch input screen, when the mode selection function is executed.

10. The method of claim 7, wherein the first region of the touch screen is a bezel region.

11. The method of claim 7, wherein the plurality of patterns are defined as different characters, sign shapes, or drag directions for each mode.

12. A vehicle system, comprising:
    a touch screen; and
    a mode controller configured to:
        execute a mode selection function when a first touch input of a predetermined pattern is input through a first region of the touch screen;

generate a pop-up window as a touch input screen on the touch screen when the mode selection function is executed;

detect a pattern of a touch input which is input through the touch input screen;

compare the detected pattern of the touch input with a plurality of patterns which are previously defined for each mode to determine whether there is a pattern identical to the pattern of the touch input; and execute a function of a mode defined in response to the pattern identical to the pattern of the touch input, wherein the mode includes at least one of a transmission mode and a driving mode, wherein the mode controller is configured to crop a screen including the pattern of the touch input based on a start point and an end point of the touch input and an end of the pattern of the touch input and detect the pattern of the touch input based on the cropped screen, and wherein the controller is configured to split the pattern of the touch input included in the cropped screen into screens and detect the screens to detect a character.

\* \* \* \* \*